United States Patent [19]

Toyooka et al.

[11] Patent Number: 4,788,672
[45] Date of Patent: Nov. 29, 1988

[54] METHOD AND APPARATUS FOR CONTROLLING RENEWAL OF DATA IN OPTICAL DISC MEMORY

[75] Inventors: Takashi Toyooka; Norio Ohta, both of Sayama; Yutaka Sugita, Tokorozawa; Kazuo Shigematsu, Saitama; Atsushi Saito, Ichikawa, all of Japan

[73] Assignee: Hitachi, Ltd., Tokyo, Japan

[21] Appl. No.: 888,006

[22] Filed: Jul. 22, 1986

[30] Foreign Application Priority Data

Jul. 29, 1985 [JP] Japan .................. 60-165775

[51] Int. Cl.$^4$ .............................. G11B 7/00
[52] U.S. Cl. ...................... 369/32; 369/30; 369/111; 360/77
[58] Field of Search .............. 369/32, 13, 45, 282, 369/284, 286, 288, 46, 109, 275, 112, 14, 30, 111, 44, 59; 360/48, 114, 131, 77, 72.1, 72.2

[56] References Cited

U.S. PATENT DOCUMENTS

| | | | |
|---|---|---|---|
| 4,229,808 | 10/1980 | Hui | 360/48 |
| 4,495,474 | 1/1985 | Nishikawa et al. | 369/59 |
| 4,545,044 | 10/1985 | Satoh et al. | 369/32 |
| 4,677,606 | 6/1987 | Ogata et al. | 369/59 |
| 4,682,318 | 7/1987 | Busby | 369/59 |

*Primary Examiner*—William M. Shoop, Jr.
*Assistant Examiner*—Brian Young
*Attorney, Agent, or Firm*—Antonelli, Terry & Wands

[57] ABSTRACT

In case of rewriting data by means of an erasable optical disc memory recording new data after having erased a series of data already stored, directory data written in an optical disc memory in order to control the written data are transferred to an external directory memory and write-in and read-out are controlled by using the directory memory. For rewriting data, which have been already recorded and which are recorded under a specified file name, the data are not erased and renewed data are written in another recording region, where recording is possible. The data, which have become unnecessary as the result of renewal, are erased during a period of time, when the optical disc memory is not accessed.

23 Claims, 5 Drawing Sheets

METHOD AND APPARATUS FOR CONTROLLING RENEWAL OF DATA IN OPTICAL DISC MEMORY

BACKGROUND OF THE INVENTION

This invention relates to a method for controlling renewal of data in an erasable optical disc memory, such as magneto-optical disc memory, phase change type optical disc memory, etc. and in particular to a method for erasing information which overcomes the drawback that an overwrite operation is not possible for these memories which produces no problems at the moment of actual memory operations.

Magneto-optical disks, phase change type optical discs, etc. have been developed as optical disc memories for which information is erasable.

A prior art magneto-optical disc memory is described e.g. in Nippon Ōyō Jiki Gakkaishi (Journal of the Japanese Applied Magnetism Society) Vol. 8, No. 5 (1984) pp. 345-349, "Actual State of the Magneto-Optical Disc Memory".

In such a type of erasable optical disc memory in order to renew (rewrite) data in a portion, where information has been already written, it is necessary to write data to be recorded after having effected an operation to erase the data in that portion, and therefore it has a drawback that overwrite, which can be effected for magnetic recording, is impossible. That is, in a prior art magneto-optical disc memory or phase change type optical disc memory, a write instruction is sent through an external interface together with a file name and data to be written. Then, the data in the directory track (disposed e.g. in an inner peripheral portion of the disc) on the disc is read-out. According to the result thus obtained, an operation to erase partially the directory data is effected at first and after that the directory data is renewed. Then, when there is found data having the same file name as that for the data to be written in the read-out directory data, the head is moved to the track including the sector corresponding to the file name in the data recording region, the data in that portion is erased, and then an operation to write the data in that portion is effected. In the case where data is read-out, read-out of the data in the directory track, movement of the head corresponding thereto and read-out of the data in the data record region relevant to the directory are effected.

Consequently, the erasable optical disc memory, such as the magneto-optical disc memory, the phase change type optical disc memory, etc., has a drawback that the cycle time for the write operation is longer than that for the magnetic disc memory. The reason therefor is due to the drawback that the erase and the write operation cannot be effected simultaneously, as described above. For example, for a magneto-optical disc memory, it is necessary to give it magnetic fields having different directions for writing and for erasing and at the same time to project laser light thereto. Therefore, if an operation to change the direction of the applied magnetic field in a very short time, e.g. in 50-100 ns, were possible, it would be possible to erase and write data simultaneously. However the inductance L of a coil generating the bias magnetic field is about 200-400 $\mu$H, the current of the coil about 0.2-0.4 A and the bias magnetic field $H_B$ to be applied several hundreds Oe. The driving voltage E, which is necessary for inverting the magnetic field generated by the coil in a period of time $\tau$ to 50-100 ns is given by $E=(I/\tau)L$. Using the values indicated above of L, I and $\tau$, the value of E is 500-2000 V. Since such a high voltage is necessary therefor, in practice, it is very difficult to overwrite data in a magneto-optical disc memory, i.e. to effect an erase and a write operation simultaneously.

On the other hand, in a phase change type optical disc memory, for effecting an erase operation, irradiation with laser light pulses is necessary using pulses having a width which is as long as several $\mu$s and which is weaker than that necessary for a write operation. Consequently it is not possible to overwrite data in it, similarly to the magneto-optical disc memory.

As the result, for writing data in an erasable optical disc memory device it is necessary to perform the following 5 steps: read-out data in the directory track, erase data in the directory track, write data in the directory track, erase data in the data track, and write data to be written in the data track. Further, in the case of the magneto-optical disc memory, a rotation waiting time, during which the disc makes one turn, is necessary in order to permit the inversion of the bias magnetic field during a period of time between the erase and the write operations. Consequently, apart from the time necessary for displacement of the head between different tracks, even if the amount of data to be written is so small that it can be recorded in one track, the disk should make more than 6 turns, before the write operation is terminated. For a rotation speed of 3000 rpm of the disk, this waiting time is longer than 120 ms. Further, adding the time necessary for the displacement of the head (80 ms $\times$ 2) thereto, the time necessary for the write operation is about 280 ms. For the phase change type optical disc memory, since the waiting time for inverting the bias magnetic field is not necessary and all the operations are terminated during 4 turns of the disk, the time necessary for the rotation of the disk is 80 ms. Therefore the time necessary for the write operation is about 240 ms.

Several methods for resolving the above problem have been proposed. Among them there is known a method, by which two heads are used. However, this method has drawbacks in that the device for realizing it is expensive and that its data rate is as low as 100 kb/sec.

SUMMARY OF THE INVENTION

The object of this invention is to provide a method and an apparatus for controlling renewal of data in an optical disc memory so as to make it possible to eliminate the drawback that overwrite is not possible and to shorten the effective cycle time for a write operation in an erasable optical disc, such as a magneto-optical disc, memory and a phase change type optical disc memory, or an electron beam disc file memory, etc.

In order to achieve this object according to this invention, directory data for controlling the content of the memory data in an erasable optical disc memory, such as a magneto-optical disc memory, a phase change type disc memory etc. are transferred to an external memory for directory consisting of semiconductor memories, etc., whose access and cycle times are shorter than those of the erasable optical disc memory and the write operation is performed, while referring to or rewriting the data in the external directory memory. That is, in the case where a series of memory data prescribed by a specified file name is rewritten, the file name is searched in the external directory memory, the data indicating the position of the actual memory region (data memory region in an optical disc memory) corresponding to the file name is stored in a part (memory for unnecessary data regions) for storing regions (unnecessary data regions), which have become unnecessary, but whose content has not yet been erased, in the external directory memory. Further, to the data indicating the actual memory region corresponding to the above file name in the external directory memory there is added data indicating that data still remains in the actual memory region, but the data is now unnecessary, and in addition the erase operation is not terminated. Then, the data indicating the position of the actual memory region (memory region in a disc memory) corresponding to the above file name is rewritten to data indicating a region in the disc memory, which has not yet been used or where the erase operation is terminated and data can be written. After that, an operation of writing data to be newly written is effected in the real memory region on the disc memory specified by the data indicating this region, where write-in is possible. After having terminated the operation and when the relevant disc memory is not accessed, the content of the above described memory for unnecessary data regions is read-out and unnecessary data on the disc memory is erased by the same method as the prior art. After that, data indicating the region, where data has been already erased, is deleted from the memory for unnecessary data.

According to this invention, since the apparent write cycle time is only the time necessary for reading and rewriting the data in the external directory memory and the time necessary for writing data on the disc, it is possible to prevent increase of the write cycle time due to the fact that overwrite is not possible.

The data in the external memory for directory is transferred to the directory region in the optical disc memory, when the optical disk memory is not accessed, or before the power supply of the device is switched-off, or before the recording medium is exchanged.

BRIEF DESCRIPTION OF THE DRAWINGS

FIGS. 4–8 are flow charts for explaining the operation of an erasable optical disc memory according to this invention, in which FIG. 4 is a flow chart indicating the process just after switch-on of the power source/exchange of the disc, FIG. 5 is a flow chart indicating the read-out operation, FIG. 6 is a flow chart indicating the write-in operation, FIG. 7 is a flow chart indicating the erase operation and FIG. 8 is a flow chart indicating the process at the time of switch-off of the power source/exchange of the disc.

DESCRIPTION OF THE PREFERRED EMBODIMENTS

Figure 1:
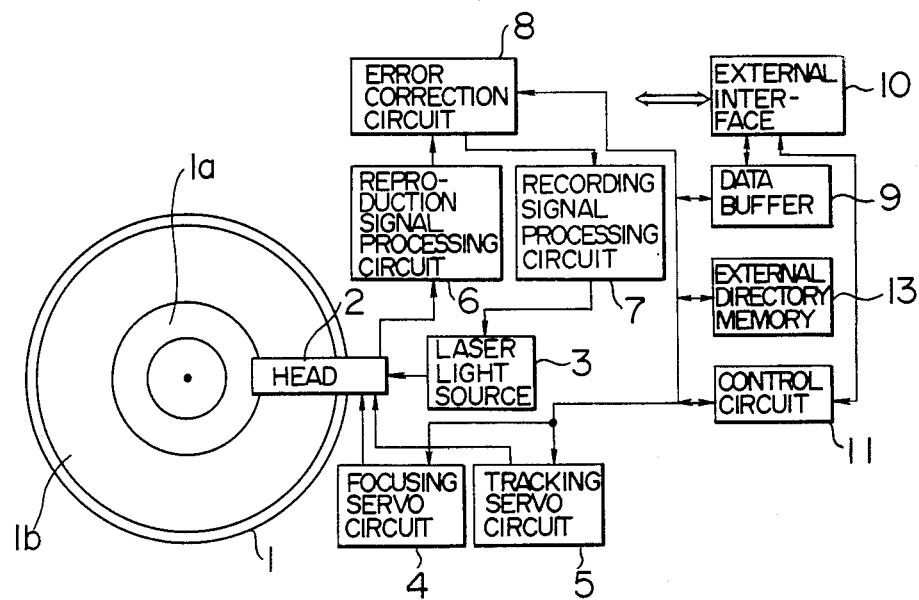
FIG. 1 is a block diagram illustrating the construction of an erasable optical disc memory to which this invention is applied.

Hereinbelow this invention will be explained, referring to some preferred embodiments. FIG. 1 shows an embodiment of an erasable optical disc memory device, to which this invention is applied. It is composed of an erasable disc shaped medium 1, in which information is recorded, a head 2 (including an optical system consisting of lenses, etc. and a magnetic circuit such as a bias magnetic coil), a laser light source 3 (e.g. a semiconductor laser, which may be incorporated in the head), peripheral circuits 4–11 controlling them, and an external directory memory 13. The disc 1 includes a data recording region 1b, where data is recorded, and a directory region 1a recording directory data for controlling the content of the data written in the data recording region 1b. Of course, the device indicated in FIG. 1 contains a driving system, such as a motor rotating the disc 1, which is not shown in the figure. A focusing servo circuit 4 drives the head 2 (e.g. it drives a focusing lens (not shown in the figure) in the head 2, which lens focuses a laser light beam on the surface of the disc 1 in the form of a light spot) and controls it so that the diameter of the light spot focused on the disc is always the smallest. A tracking servo circuit 5 controls the position of the spot projected by the head 2 (e.g. while driving a galvano-mirror (not shown in the figure) disposed in the head 2) so that the light spot is located at the desired track. A reproduction signal processing circuit 6 receives light reflected by the optical disc 1 with a photo-diode (not shown in the figure) disposed in the head 2, transforms variations in intensity of the light into electric signals and proceeds to various processing such as demodulation. Further focusing servo signals and tracking servo signals are also detected from the light reflected by the optical disc. A recording signal processing circuit 7 has a function to supply a pulse voltage corresponding to the data to be written to the laser power source. An error correction circuit 8 adds an error correction code (ECC) to the data to be written. In addition it effects detection and correction of errors contained in the read-out data. A data buffer 9 is used for storing temporarily data to be written and read-out data and sends the read-out data to and receives the data to be written from a host computer through an external interface 10. A control circuit 11 has a function to control the whole system.

An external directory memory 13 includes a recording region having the same capacity as the directory region 1a and holds the directory data with the same format. The directory data 20 includes data having a structure indicated in FIG. 2, i.e. a directory number (the address of the track number and the sector number indicating the position of the relevant directory data) 21, data 22 indicating the actual recording region corresponding to the directory number, data 23 indicating the file name of the data written in the actual recording region and data 24 indicating the state of the data written in the actual recording region corresponding to the directory number. There are three states of the data written in the actual recording region; i.e. in the first state the content of the record is valid; in the second state the data are not erased, but they are invalid and wait for erasing and in the third state the data have been already erased or the relevant region has not yet been used and therefore writing can be effected immediately.

For the external directory memory 13, semiconductor memories (dynamic RAM, static RAM, semiconductor non-volatile memory), or a magnetic bubble memory whose cycle time for read-out and write-in is sufficiently short with respect to that of the optical disc memory, can be used.

Figure 2:
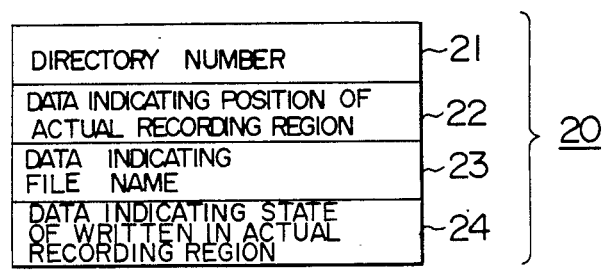
FIG. 2 shows an example of contents of directory data used for this invention.
Figure 3:
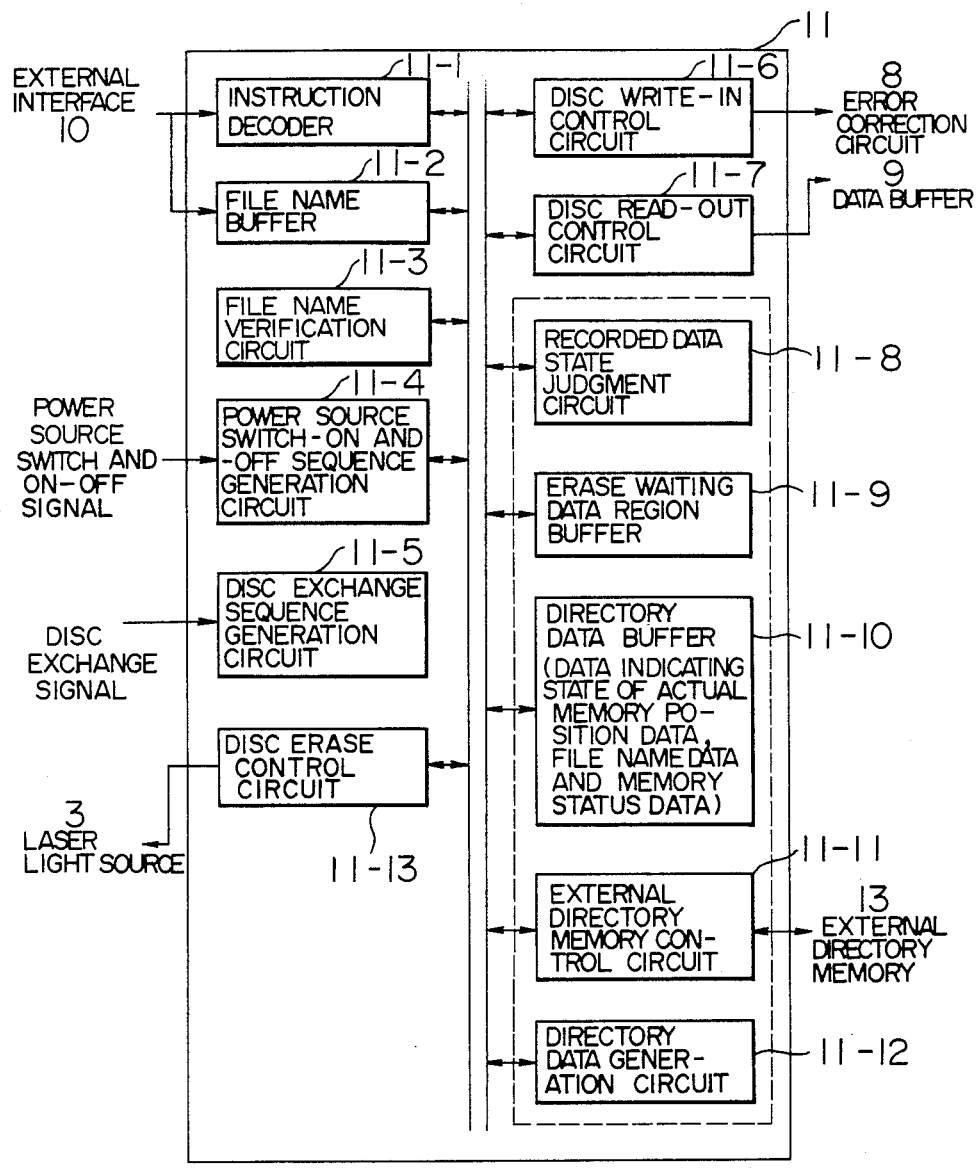
FIG. 3 is a block diagram illustrating an example of control circuits controlling the information rewriting operation according to this invention.

FIG. 3 shows the construction of the control circuit 11 in detail. An instruction decoder 11-1 interprets an instruction received through the external interface 10. A file name buffer 11-2 has a function to receive the data of the file name to be read out or to be written from the external interface 10 and to hold them. A file name verification circuit 11-3 is a circuit judging if the file name held by the file name buffer 11-2 and the file name read-out from the directory region 1a in the disc are in agreement with each other or not. A power source switch-on and -off sequence generation circuit 11-4 generates signals for controlling the sequence of power source switch-on and -off. A disc exchange sequence generation circuit 11-5 generates control signals for the disc exchange. A disc write-in control circuit 11-6 controls the operation to write data in the disc and a disc read-out control circuit 11-7 controls the operation to read-out data from the disc. An external directory memory control circuit 11-11 controls the operation to read-out data from and write data in the external directory memory 13. A directory data generation circuit 11-12 has a function to generate directory data indicated in FIG. 2 and to send the directory data to a directory data buffer 11-10. The directory data buffer 11-10 has a function to receive the directory data 20 indicated in FIG. 2 from the external directory memory 13, the directory 1a on the disc 1 or the directory data generation circuit 11-12 and to hold it temporarily. A recorded data state judgment circuit 11-8 is a circuit judging the data 24 indicating the state of the recorded data in the directory data 20 held in the directory data buffer 11-10. An erase waiting data region buffer 11-9 is a buffer holding data indicating regions on the disc 1, which are not erased but have the unnecessary data.

A phase change type optical disc memory has a structure almost identical to that indicated in FIGS. 1–3. However the head 2 has no bias magnetic coil, which is necessary for the case of a magneto-optical disc memory. To the contrary, since it is necessary to vary the intensity of the projected laser light, depending on whether the operation is write-in or erase, there is added a circuit controlling the intensity of the laser light, depending on whether the operation is write-in or erase.

By operating the device according to the sequence indicated below it is possible to shorten the time for reading-out and writing the directory data 20 and also to remove the drawback that the write-in cycle time is lengthened due to the fact that an erase operation should be effected, when data is written in the optical disc 1.

Figure 4:
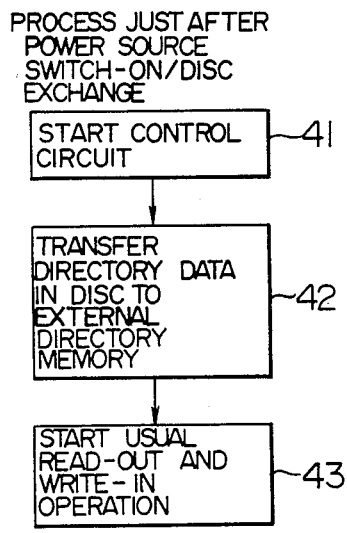

(1) Sequence just after power source switch-on or just after optical disc medium exchange Just after a power source switch-on or an exchange of the optical disc medium, start at first the control circuit 11 (Step 41), as indicated in FIG. 4. Then effect a process to transfer data in the directory region 1a of the optical disc 1 to the external directory memory 13 (Step 42). After the termination of this operation, proceed to a state to wait for a usual read-out or write-in demand (Step 43).

In more detail, according to a signal coming from the power source switch-on and -off sequence generation circuit 11-4, the disc read-out control circuit is operated and the data in the directory region 1a is transferred to the directory data buffer 11-10. Then a process is effected, by which this data is stored in the external directory memory 13 through the external directory memory control circuit 11-11.

(2) Sequence for read-out

Figure 5:
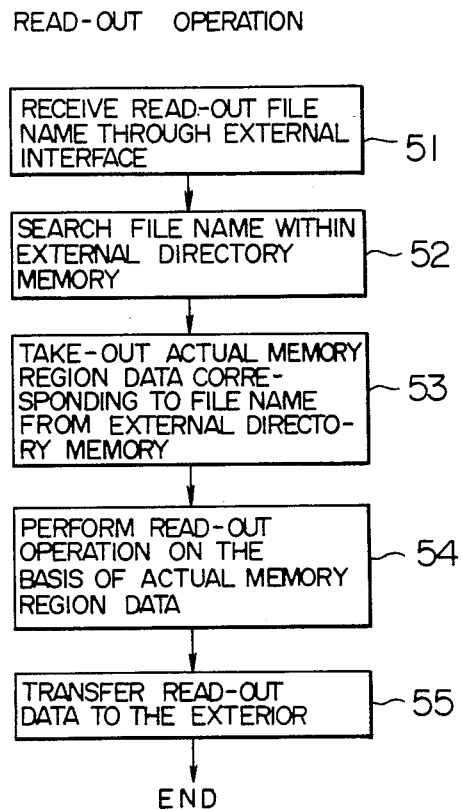

Read-out is effected according to the sequence indicated in FIG. 5. Receive a read-out file name through the external interface 10 (Step 51). Then search the received file name in the external directory memory 13 (Step 52). Take-out the data 22 indicating the position of the actual memory region on the disc 1 (e.g. the track number, the sector number on the disc) from a portion of the directory memory 13 corresponding to the file name and specified by the directory number (Step 53). That is, read-out the content of the external directory memory 13 by using the external directory memory control circuit 11-11 and send it to the directory buffer 11-10. Detect the data 22 indicating the memory position on the disc 1 corresponding to the relevant file name by comparing the read-out file name stored in the file name buffer 11-2 with the file name data in the directory buffer 11-10 by means of the file name verification circuit 11-3. Read-out of the memory data in the real memory region is effected by means of the disc read-out control circuit 11-7. Perform a read-out operation while moving the head 2 on the basis of the data 22 indicating the detected actual memory region corresponding to the read-out file name (Step 54). At this read-out operation store temporarily the read-out data in the data buffer 9 by operating the peripheral circuits 3-8 indicated in FIG. 1 and the disc read-out control circuit 11-7 in the control circuit 11. Transfer this data to the computer side through the external interface 10 (step 55).

(3) Sequence for write-in

Figure 6:
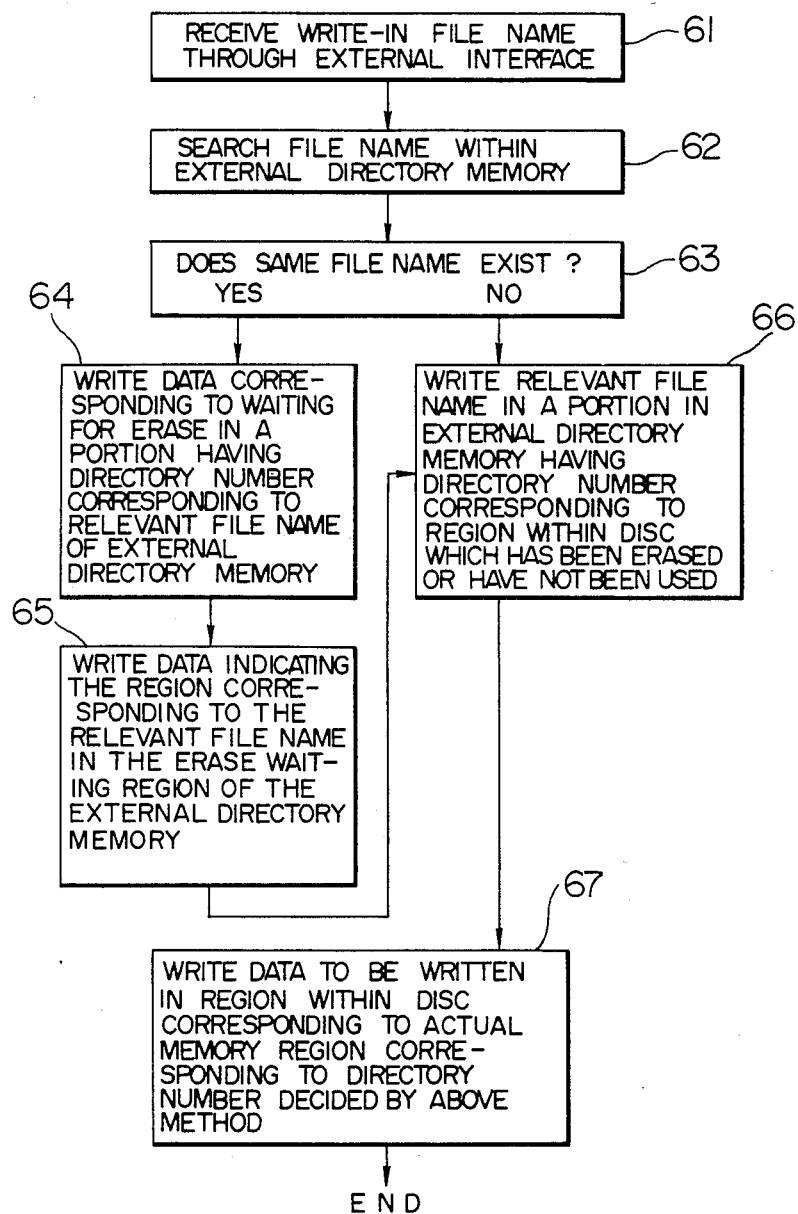

Write-in is effected according to the sequence indicated in FIG. 6. Receive a write-in file name through the external interface 10 (Step 61). Then search the received file name by using the external directory memory 13 (Step 62). Judge whether the same file name exists or not (Step 63). In the case where the same file name is found, write the memory region data having the relevant file name of the external directory memory 13 in an erase waiting data region (Step 64). Further delete the data indicating the relevant file name in the external directory memory 13 and rewrite the data indicating the state of the data stored in the real memory region into the erase waiting data corresponding to the state indicating that the data is not erased, but they are invalid (Step 65). In the case where the same file name is not found, the operations described above are not effected. In either case, next write the file name stated above in an unoccupied region 1a on the optical disc 1 found during the search of the external directory memory 13, i.e. in a part having a directory number in the external directory memory 13 corresponding to a region which has not yet been used or where data have been erased (Step 66). After that, write data to be written in the region 1b within the optical disc 1 corresponding to the actual memory region corresponding to the directory number decided in the manner described above (Step 67).

The working mode of the control circuit 11 in this write-in operation is as follows.

In Step 61, the write-in file name is received by the file name buffer 11-2. In Step 62, the file name is searched by the same processes as those for the read-out operation by means of the directory data buffer 11-10, the external directory memory control circuit 11-11 and the external directory memory 13. Steps 64 and 65 are performed as follows. That is, in the case where the same file name is found, the data indicating the real memory position in the directory data buffer 11-10 is stored in the erase waiting data region buffer 11-9. Further, the file name 23 is deleted from the directory data buffer 11-10. In addition, the data 24 indicating the state of the memory data is rewritten to the data indicating to be waiting for erase. The data in the directory data buffer 11-10 and the erase waiting data region buffer 11-9 are written in the external directory memory 13 through the external directory memory control circuit 11-11. In the case where the same file name is not found, the operations described above are not effected. In either case, in the following Step 66, the search in the external directory memory 13 is effected by using the directory data buffer 11-10 and the external directory memory control circuit 11-11. When an unoccupied region is found on the optical disc 1, the file name data 23 is written in the directory data buffer 11-10 by the directory data generation circuit 11-12. This new directory data is written in the external directory memory 13 through the external directory memory control circuit 11-11. Finally, in Step 67, according to the data 22 indicating the actual memory region corresponding to the directory number 21 decided by the method described above, the data to be written is written by using the disc write-in control circuit 11-6.

(4) Erase operation

Figure 7:
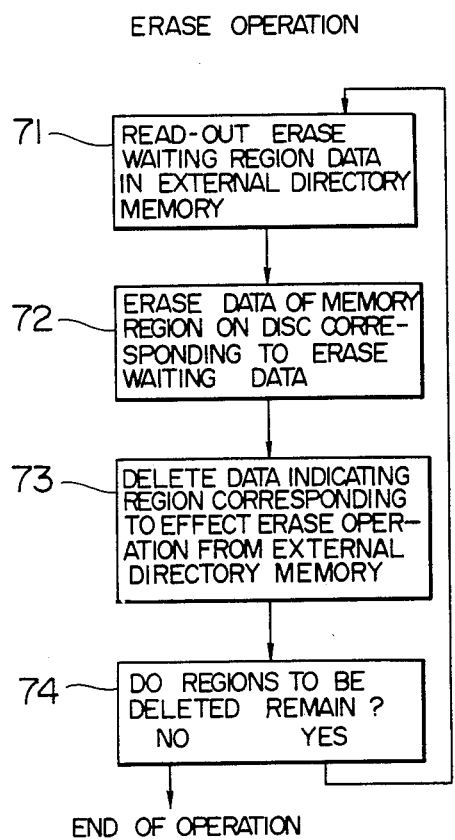

The write-in operation data, which is now unnecessary, remains on the optical disc 1. Consequently the unnecessary data on the disc 1 is erased according to the operation indicated in FIG. 7 during a period of time, when the optical disc memory is not accessed. In this process the data indicating the erase waiting data region is taken out from the external directory memory to the erase waiting data region buffer 11-9 (Step 71). The data of the memory region on the optical disc 1 assigned by the data in the erase waiting data region buffer 11-9 is erased by the disc erase control circuit 11-13 (Step 72). Then the relevant data on the erase waiting data region buffer 11-9 and the directory data buffer 11-10 are renewed to indicate the fact that the region to be erased has been erased. eext the data on the erase waiting data region buffer 11-9 and the directory data buffer 11-10 are written in the external directory memory 13 through the external directory memory 11-11 and thus the data corresponding to the region where data has been erased is erased for the erase waiting region data within the external directory memory 13 (step 73). Then it is judged whether regions to be erased still remain or not (Step 74) and as far as regions to be erased still remain, Steps 71-74 are repeated. However, when a read-out or write-in instruction is received through the external interface 10, this operation is interrupted.

(5) Process at a power source switch-off or disc exchange

Figure 8:
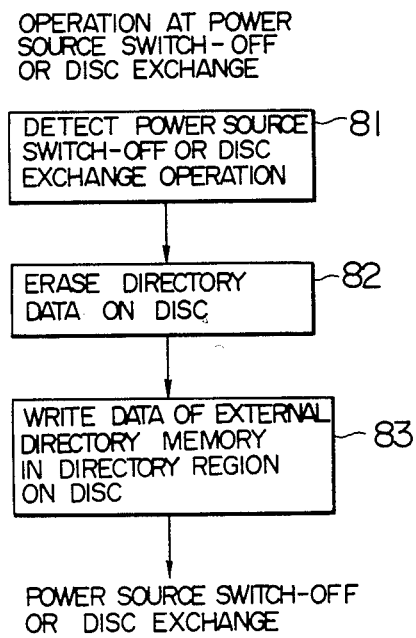

Just before the power source is switched-off or the optical disc 1 is exchanged, the process indicated in FIG. 8 is effected. When a signal indicating a power source switch-off or disc exchange operation is received by the power source switch-on and -off sequence generation circuit 11-4 or the disc exchange sequence generation circuit 11-5 and the power source switch-off or disc exchange operation is detected (Step 81), the following operations are performed. Erase the relevant directory data on the disc 1 by using the disc erase control circuit 11-13 (Step 82). Then, read-out the data from the external directory memory 13 to the directory data buffer 11-10 and to the erase waiting data buffer 11-9 by means of the external directory memory control circuit 11-11 and write this data in the directory track 1a on the optical disc 1 by using the disc write-in control circuit 11-6 (Step 83). It is more advantageous when the power source is switched-on again or when the disc is used again to effect an operation of erasing erase waiting data on the disc, according to the operation indicated in FIG. 7, before performing this process.

Furthermore it is more advantageous to use RAMs with back-up by battery, non-volatile semiconductor memories, or a magnetic bubble memory for the external directory memory 13, taking the protection of stored data against power stoppage during the operation of the optical disc memory into account. This is because the directory data indicating the memory state on the used optical disc will be lost, if the content of the external directory memory 13 disappears at a power stoppage, due to the fact that the directory data in the directory track 1a on the optical disc is taken out to the external directory memory 13 and its content is renewed there.

According to this invention, it is possible to remarkably shorten the cycle time for processing and writing directory data of an erasable optical disc such as a magneto-optical disc memory, a phase change type disc memory and others, in which overwrite is not possible, or a particle beam disc file using an electron beam, etc.

In the case where a memory, whose cycle time necessary for read-out and write is 5 ms on an average, is used as the external directory memory, the average read-out cycle time can be reduced from 220 ms (sum of head moving time 80 ms$\times$2, rotation waiting time 10 ms$\times$2 and read-out time 20 ms$\times$2) up to this time to 115 ms (head moving time 80 ms$\times$1, rotation waiting time 10 ms$\times$1, read-out time 20 ms$\times$1 and read-out time of the external directory memory 13 5 ms), which is about a half of the former. In addition, the average write-in cycle time can be reduced from 320 ms (head moving time 80 ms$\times$2, rotation waiting time 10 ms$\times$2, read-out time 20 ms$\times$1, erase time 20 ms$\times$1, bias magnetic field inversion waiting time 20 ms$\times$3 and write-in time 20 ms$\times$2) up to this time to 140 ms (time necessary for reading-out the external directory memory 13 5 ms, time necessary for writing data in the external directory memory 13 5 ms, head moving time 80 ms$\times$1, bias magnetic field inversion waiting time 20 ms$\times$1, write-in time 20 ms$\times$1, rotation waiting time 10 ms$\times$1).

We claim:

1. A method for controlling the reading and writing of data in an optical disc memory, such as an erasable optical disc memory, which stores data and directory data in respective regions, comprising the steps of transferring directory data written in said optical disc memory to an external directory memory, and controlling write-in and read-out of data to and from the optical disc memory by using the directory data stored in said external directory memory.

2. A method for controlling the reading and writing of data in an optical disc memory according to claim 1, wherein, in case of rewriting data which has been already recorded and which is recorded under a specified file name in a data recording region of the optical disc memory, the data in said data recording region is not erased and renewed data is written in another recording region, where recording is possible.

3. A method for controlling the reading and writing of data in an optical disc memory according to claim 2, wherein said another erasable recording region is a recording region which has not yet been used or one where an erase operation has been already effected.

4. A method for controlling the reading and writing of data in an optical disc memory according to claim 2, wherein data, which has become unnecessary as the result of renewal, is erased during a period of time when said optical disc memory is not being accessed.

5. A method for controlling the reading and writing of data in an optical disc memory according to claim 2, wherein data, which has become unnecessary as the result of renewal but which has not yet been erased in the data recording region, is stored in said external directory memory during the erase operation.

6. A method for controlling the reading and writing of data in an optical disc memory according to claim 1, wherein directory data and the data in said external directory memory includes data indicating the state of the data written in the data recording region of said optical disc memory.

7. A method for controlling the reading and writing of data in an optical disc memory according to claim 6, wherein said data indicating the state of the data specifies one of three kinds of data, including data indicating that valid data is written in the write-in region, data indicating that data which has become unnecessary and has not yet been erased still remains; and data indicating that the region has not yet ben used or that the data in the region has been already erased.

8. A method for controlling reading and writing of data in an optical disc memory according to claim 1, wherein at the time of power source switch-on or the loading of an optical disc medium, the directory data on the optical disc medium is transferred to said external directory memory, and before the power source switch-off and the unloading of the optical disc medium, the data in said external directory is recorded in the directory region on said optical disc medium.

9. A method for controlling the reading and writing of data in an optical disc memory according to claim 8, wherein semiconductor non-volatile memories are magnetic bubble memories are used for said external directory memory.

10. A method for controlling the reading and writing of data in an optical disc memory according to claim 8, wherein magneto-optical recording memories, phase change type disc memories or electron beam disc file memories are used for said optical disc memory.

11. An apparatus for controlling the reading and writing of data in an optical disc memory, comprising:
   an erasable optical disc memory having a recording region for recording data and a directory region recording direction data for controlling the content of the data written in said recording region, for which record and erase cannot be effected simultaneously;
   head means for recording, reproducing and erasing said data and directory data on said optical disc memory;
   external directory memory means for storing said directory data with the same format as that of the directory data in said directory region on said optical disc memory; and
   control means connected with said external directory memory means and said head means for controlling write, read and erase operations of said head means using the directory data stored in said external directory memory means.

12. An apparatus for controlling the reading and writing of data in an optical disc memory according to claim 11, wherein said control means comprises a directory data buffer holding temporarily said directory data and an external directory memory control circuit controlling the read-out and the write-in operation of said external directory memory means, whereby the directory data read-out from said directory region on said optical disc memory is stored in said directory data buffer and the content of said directory data buffer is stored in said external directory memory means under the control of said external directory memory control circuit.

13. An apparatus for controlling the reading and writing of data in an optical disc memory according to claim 12, wherein said control means comprises a file name buffer storing a specified file name and file name verification means for comparing the file name stored in said file name buffer with a file name stored in said directory data buffer, whereby the directory data read-out from said external directory memory means under the control of said external directory memory control circuit is stored in said directory data buffer along with the storing position of the data on said optical disc memory, which data is stored with said specified file name by using the content of the directory data.

14. An apparatus for controlling the reading and writing of data in an optical disc memory according to claim 12, wherein said control means comprises an erase waiting data region buffer holding data indicating the storing position of unnecessary data to be erased on said optical disc and means for erasing said unnecessary data by controlling the erase operation of said head means on the basis of the content of said erase waiting data region buffer.

15. An apparatus for controlling the reading and writing of data in an optical disc memory according to claim 13, wherein said control circuit rewrites the content of said directory data buffer to data indicating the erase waiting state and the content of said directory data buffer is written in said external directory memory means under the control of said external directory memory control circuit.

16. A method for controlling renewal of data in an optical disc memory comprising:
   (1) writing new recording data in a region where the write operation has not yet been effected or where an erase operation has already been effected;
   (2) effecting an erase operation while the optical disc memory is not accessed;
   (3) transferring the directory data in a directory region on said optical disc memory to an external directory memory when the power is turned on or when a new disc medium is loaded; and
   (4) transferring said directory data on said external directory memory to said directory region on said optical disc memory.

17. A method for controlling renewal of data in an optical disc memory according to claim 16, wherein said directory data in a directory region on said optical disc memory and said external directory memory include data which indicates the status for the recording region that the data in said region is effective, that the data in said region is not effective but has not yet been erased, or that the region has been subjected to an erase operation or has not been subjected to a write operation.

18. A method for controlling renewal of data in an optical disc memory according to claim 16, wherein said directory data in a directory region on said optical disc memory and said external directory memory includes data which indicates regions where the data is not effective, but has not yet been erased.

19. An apparatus for controlling renewal of data in an optical disc memory comprising:
  (1) means for controlling a laser beam for write, read and erase operations;
  (2) an external directory memory by which the read, write and erase operations are controlled;
  (3) means for transferring the directory data from the directory region in an optical disc medium to said external directory memory;
  (4) means for transferring said directory data from said external directory memory to said optical disc medium; and
  (5) means for effecting an erase operation while said optical disc memory is not accessed.

20. An apparatus for controlling renewal of data in an optical disc memory according to claim 19, wherein said external directory memory is composed of non-volatile memory including any one of semiconductor non-volatile memory and magnetic bubble memory.

21. An apparatus for controlling renewal of data in an optical disc memory according to claim 19, wherein said optical disc memory is magneto-optical disc memory, phase change type optical disc memory or electron beam disc file memory.

22. An apparatus for controlling renewal of data in an optical disc memory according to claim 19, wherein said directory memory includes an area for storing data which indicates the positions of the regions on said optical disc medium which are to be effected by an erasing operation.

23. An apparatus for controlling renewal of data in an optical disc memory according to claim 19, wherein said directory data in a directory region on said optical disc memory and said external directory memory include data which indicates the status for the recording region that the data in said region is effective, that the data in said region is not effective but has not yet been erased, or that the region has been subjected to an erase operation or has not been subjected to a write operation.

* * * * *